Figure 7:
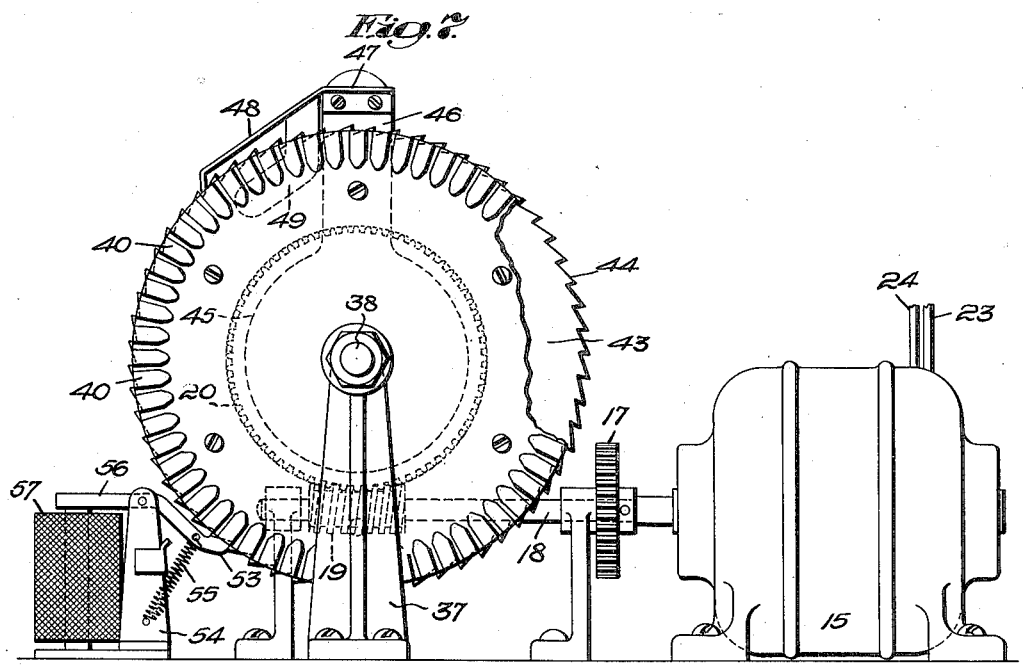

July 14, 1936.    A. J. HIXON ET AL    2,047,586
VISIBLE PAGING SYSTEM
Filed Feb. 20, 1931    5 Sheets-Sheet 1
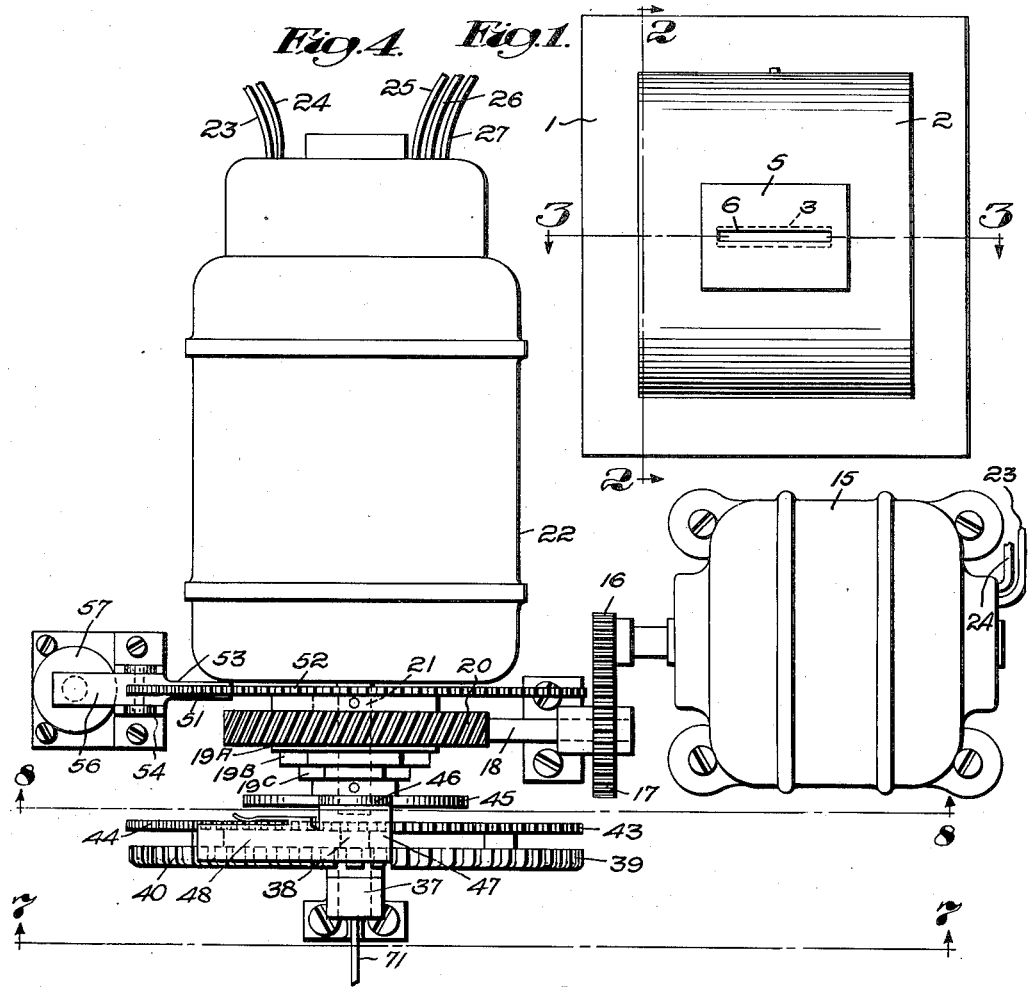
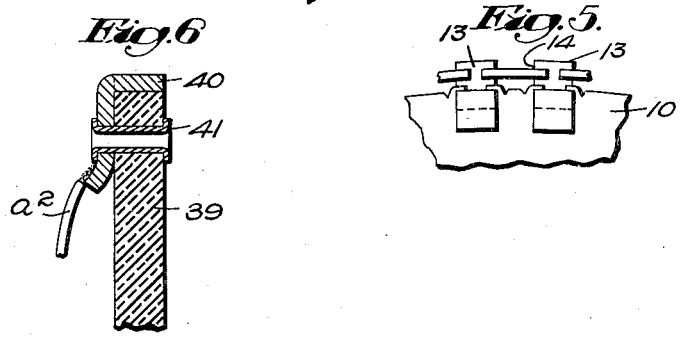
Inventors:
Alfred J. Hixon
Willard W. Thompson

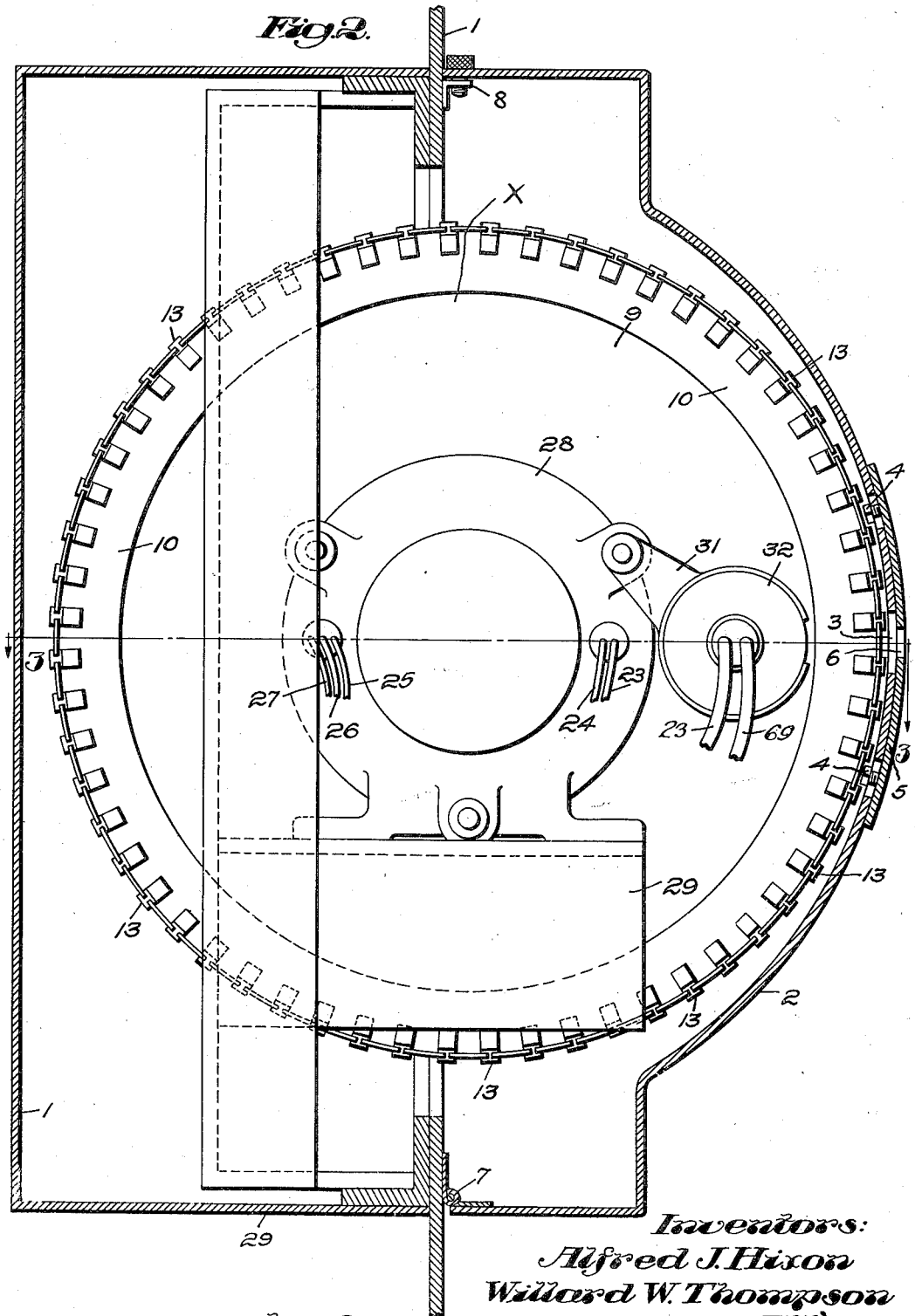

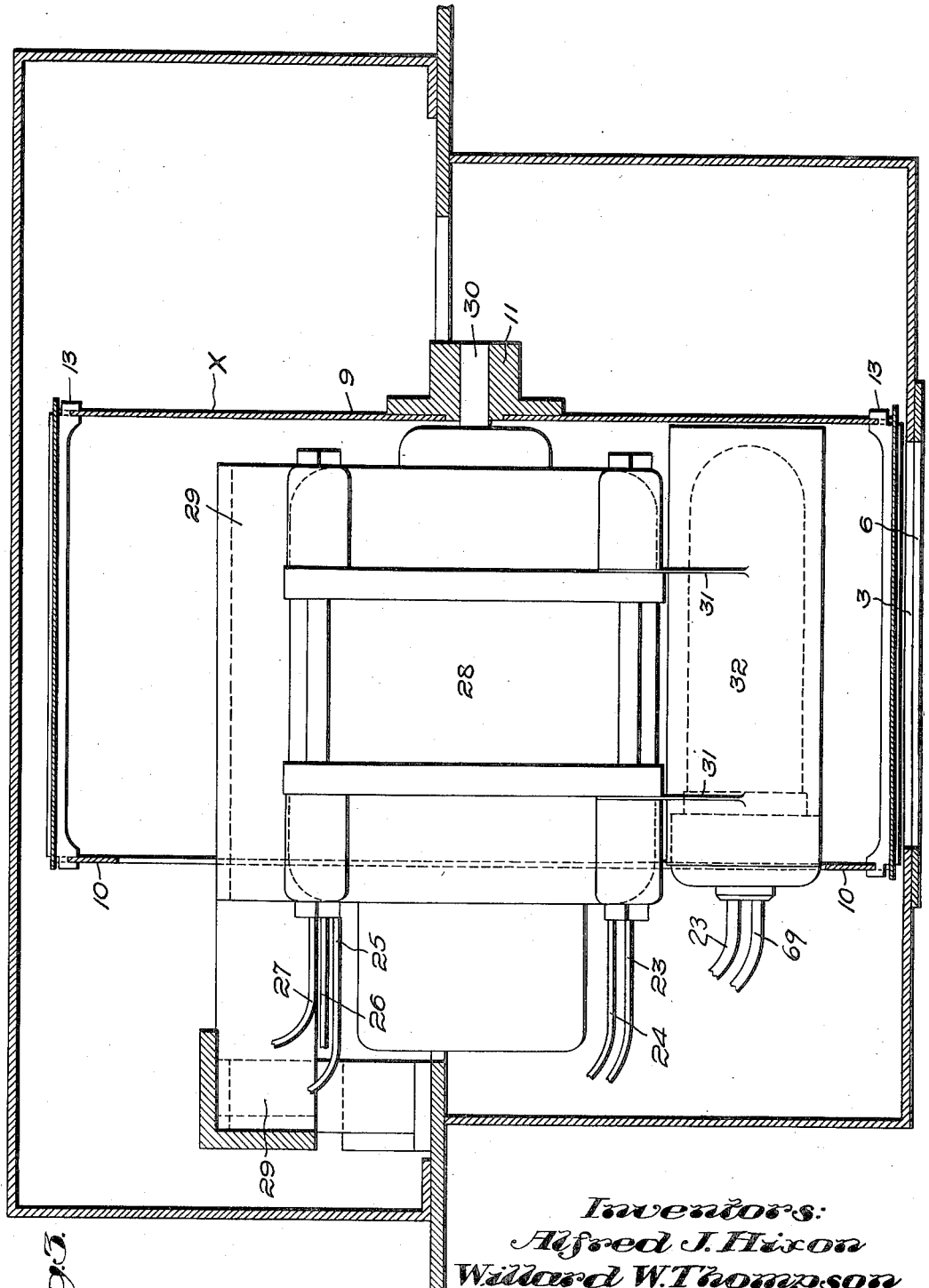

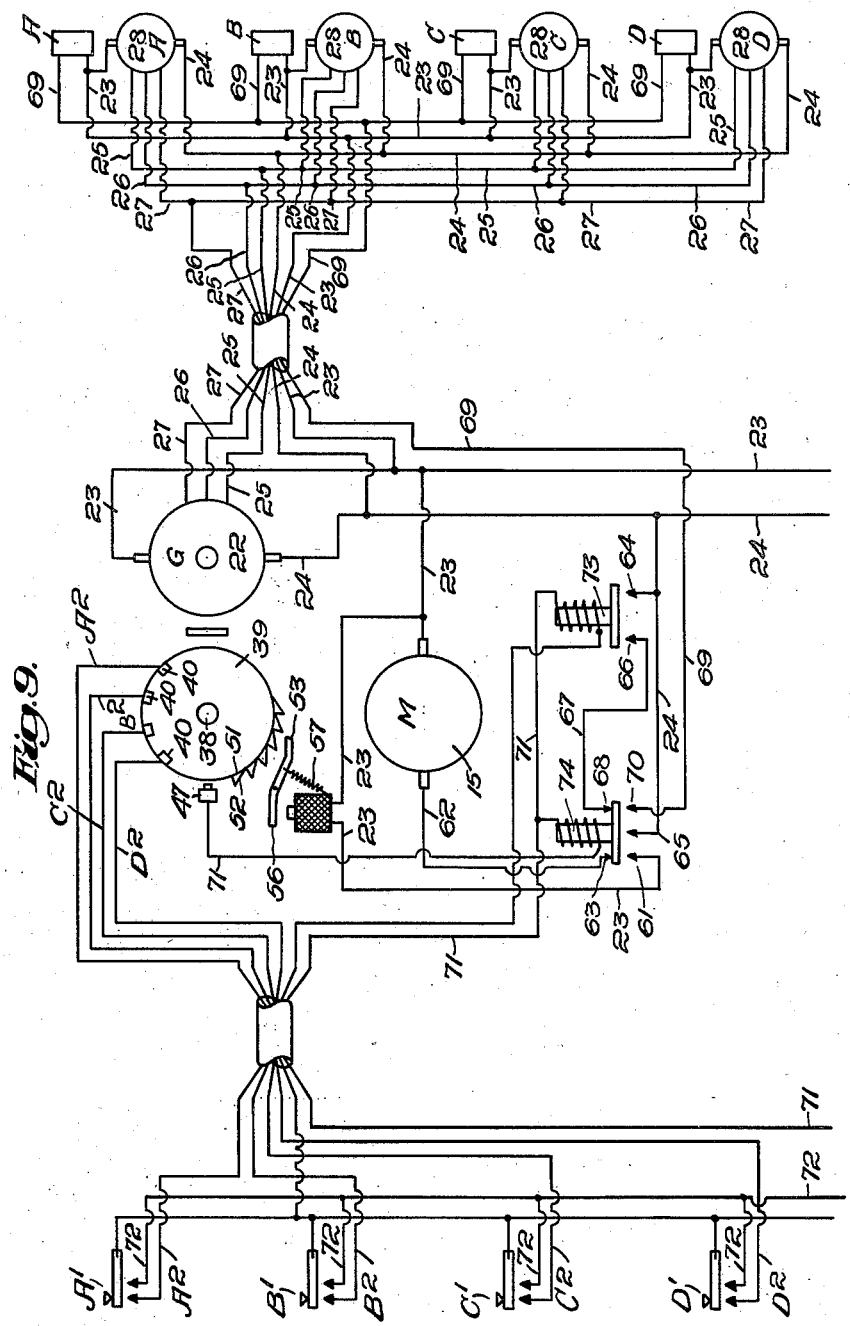

Patented July 14, 1936

2,047,586

UNITED STATES PATENT OFFICE 2,047,586

VISIBLE PAGING SYSTEM

Alfred J. Hixon, Braintree, and Willard W. Thompson, Milton, Mass., assignors to Hixon Electric Co., South Boston, Mass., a corporation of Massachusetts Application February 20, 1931, Serial No. 517,272

6 Claims. (Cl. 177—333)

This invention relates to signaling devices in general and more particularly to so called "paging" or calling devices for calling certain desired persons at one or more given stations.

The mechanism is particularly designed for use in institutions where quietness is necessary, as hospitals and the like, and where audible calls are objectionable, but it may be used anywhere, and its object is to provide new and improved means for visibly paging or summoning the desired party simultaneously at a plurality of stations.

Figure 8:
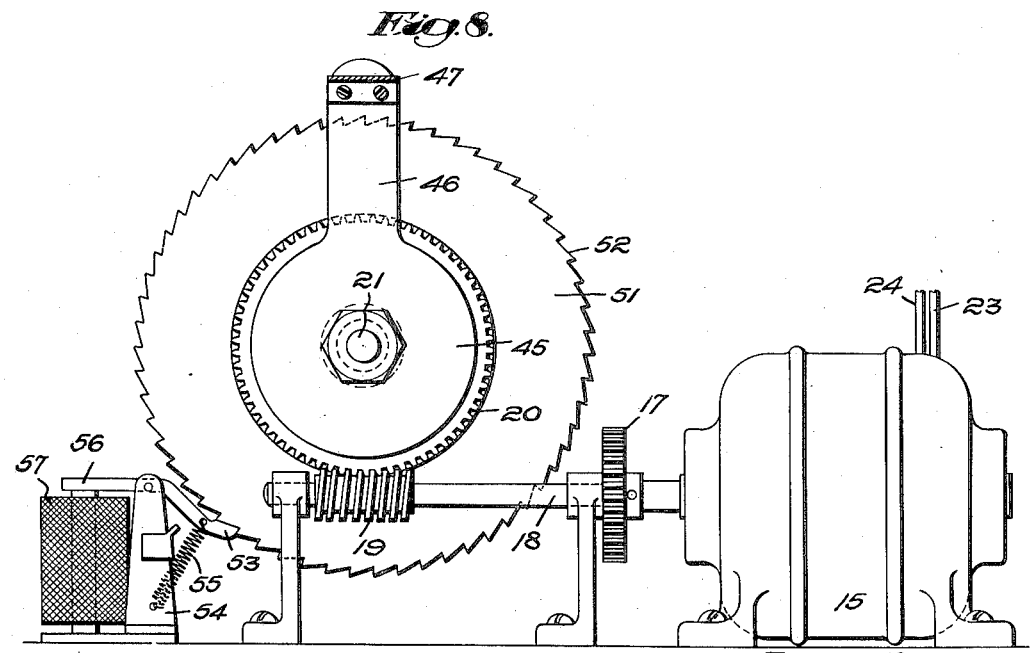

In the drawings of one embodiment of our invention selected for illustration and description herein, Fig. 1 is a front elevation of the annunciator;

Fig. 2, a vertical section on an enlarged scale on the line 2—2, Fig. 1;

Fig. 3, a horizontal section on an enlarged scale on the line 3—3, Fig. 1;

Fig. 4, a plan of the assembled driving motor, master generating device and selective annunciator control members;

Fig. 5, a detail of the anunciator rack construction shown in Fig. 2;

Fig. 6, a detail of the terminal contact member shown in Fig. 4;

Fig. 7, a side elevation of the driving motor and terminal contact member looking in the direction of the arrow, and on the line 7—7, Fig. 4;

Fig. 8, a vertical cross-section on the line 8—8, Fig. 4, looking in the direction of the arrow; and Fig. 9, a schematic wiring diagram for connecting the several elements, as assembled.

Referring first to Figs. 1 and 2, our novel system comprises an anunciator, having, if desired, any suitable container or case 1, with a preferably convex front section 2 with a legend displaying slot or window 3 therein, at any convenient point, Or, if preferred, a shield member to shield the eyes from the light of the lamp to be described, and provided with the window 3, may be used. On the outer face of this section 2, and adjustably secured thereon as by screws 4, preferably on the inside, is secured a plate 5 with a narrow window 6 therein, which plate may be adjusted to register, as to position, with the window in the legend or name presenting member or annunciator rack to be described. The part 2 of the case may be hinged at 7 for convenient access thereto and fastened by any suitable device 8 at the top.

The anunciator rack proper, Figs. 2, 3, comprises a cylindrical, rotatable member X, having one closed end 9 and an opposed ring 10 only at its opposite, open end, the former carried by a hub 11 on and rotating with a shaft to be described, in bearings, not shown. Entirely about and secured at suitable points to the circumferential edges of the members 9, 10, there are legend or name-card carrying bars 13, which also act as tie bars for the opposed end members 9, 10. These latter members are slotted somewhat, see dotted lines, Fig. 5, to receive the bars 13, the latter also being slotted to receive the members 9, 10.

The bars 13 are also grooved longitudinally on their opposite side faces at 14 to receive transparent cards or slips of paper, celluloid, or any suitable material, each bearing the name of an individual, such as a physician, whom it may be desired to call from the principal station, and which cards are selectively caused to be positioned opposite the window 6 by the rotation of the anunciator rack actuated by means of a supplementary synchronous motor and held in position by the angular relation of the motor to its master generator, all of which will presently be described. Obviously as many name cards may be mounted on the rack as there are bars to receive them; they are readily changeable.

Our invention contemplates the use of any desired number of these annunciators placed individually at desired points, as the several wards of a hospital, or departments of any institution, and all actuated simultaneously from a master generator device, located at any convenient place as the main office, or telephone desk, which master generator, in turn, is operated by one or more manually controlled current closing devices placed at desired locations (preferably the main office), for sending out signals or information, such as the head office referred to.

Our invention comprises, generally speaking, three different parts or groups of elements, first, the manually operated circuit closing elements above referred to, such as a series of push buttons or plugging devices which would be placed at the point from which the signals are to be sent; second, the master generator mechanism located where convenient, which operates automatically from the sending device by means of a motor for the purpose of operating a synchronous generator to a predetermined position or angularity; and third, any number of signal devices or anunciators, each comprising an induction motor energized from any source of alternating current, as the generator of the master device, and having connected to them means for indication of the position of these rotating members which will follow the master device and remain in angular synchronism with it.

One suitable and satisfactory mechanism, Figs. 4, 6, 7, 8, and 9, is that shown and described in United States Letters Patent No. 684,579, and as used herein generally, includes a master electric generating device 22 and any desired number of supplementary annunciator motor devices 28 of the same type suitably electrically connected.

The master electric generator device 22 which we use in this connection must be driven by an ordinary motor of suitable capacity. We have shown in Fig. 4 a conventional motor 15 for this purpose, having a pinion 16 on its shaft, in mesh with a gear 17 on a shaft 18 in suitable bearings, carrying a worm 19 which, in turn, meshes with a gear 20, frictionally mounted by means of a spring member 19a and nuts 19b, 19c, for turning of the shaft 21 of the master generator device 22. The current for operating motor 15 is supplied from wires 23 and 24 which also supply current for exciting both master generator 22 and annunciator motors A28, B28, C28, D28, and must be alternating current and of desired voltage and frequency. Wires 25, 26, 27 are energy control wires running from the master generator to the various annunciator motors.

Wire 69 is a common switch wire from relay 74, to be described, to annunciator lamps which are fed by current supplied from wires 23, 24. Thus all annunciators are connected in multiple on a six wire cable of small capacity, which effects a great saving in installation cost.

In some cases, Figs. 2, 3, we have found it convenient to place the annunciator motor within the annunciator rack X and it is here so shown, although it should be understood that, as the several devices, are only connected by operating lines, they may be placed at any convenient location. The annunciator motor 28 which immediately controls the annunciator X in this instance, Fig. 2, is mounted upon a suitable base 29, supported from without, but extending laterally into the rack X through the ring 10, Figs. 2, 3, and the rack hub 11, by which the former is carried, is mounted upon the shaft 30 of the motor 28 as previously suggested.

On the casing of the motor 28 is mounted, Figs. 2, 3, as by means of one or more arms 31, an electric lamp 32 opposite the window 6 in the casing 2, and the name card in the rack adjacent the same. The lines 69, 23 from the lamp run to any convenient source of power, as the master generator device through the relay 74.

For driving the several motor devices 28 and their card racks, we have provided the following novel means. Upon the post 37, Figs. 4, 7, is a laterally extended stud 38, opposite to which is the shaft 21 of the master generator 22, and on this stud 38 is fixed a circular terminal contact disc 39 of insulating material, having secured about its edge a plurality of angular terminal contacts 40, see also Fig. 6, by any suitable means, in this case eyelets 41, each terminal connected to one end of a line, as A2, as hereafter described running to a circuit closing device at a central control station, shown diagrammatically, Fig. 9.

Adjacent this disk 39, Figs. 4, 7, and on the same stud 38, is a suitable contact breaker disk 43, provided with teeth 44 about its edge, which raise the contact 48 as it passes from one contact 40 to another to avoid short circuiting between the contacts. On the shaft 21 adjacent the disk 43 is a smaller disk conductor 45 with an arm 46 thereon, Figs. 4, 7, sufficiently long to extend radially beyond the edge of the disks 39, 43, and carrying an insulated plate 47 with a contact arm 48 circumferentially overhanging and contacting with the terminals 40 on the edge of the disk 39, and on the arm is also a downwardly extended flexible brush 49 which contacts with the side of the disk 43, thus establishing connection between the disk 43 and terminals 40.

For the purpose of promptly stopping the rotation of the shaft 21 of generator 22, Figs. 4, 8, we mount on the shaft a disk 51 with teeth 52, and provide a pawl 53 on the post 54, and normally held out of engagement with the disk by a spring 55 on the pawl and post, the rear end of the pawl acting as the armature 56 for the coil 57 which is energized in the manner hereafter described, and the pawl thus caused to engage the teeth 52 and stop the rotation of the disk and generator.

In Fig. 9 we have shown a diagrammatic arrangement of the described parts and their wiring connections, showing, for illustration, four annunciators A, B, C, D, and correspondingly identified calling or circuit closing devices of any conventional style. In this diagram, the disks 39, 52, which in reality are axially aligned upon the shaft 21 of the motor 22 are, of course, not so shown, for the sake of clearness.

A series of circuit closing devices as jacks A', B', C', D', Fig. 9, of any convential type are mounted upon any suitable control board, not shown, at the calling station.

The line 23 from any source of A. C. current, not shown, is connected to the several auxiliary motor devices A28, B28, C28, D28, the several annunciator lamps A, B, C, D, one pole of the operating motor 15 and the master generator device 22; and also is connected with the magnet 57 and through terminal 70 to the relay lighting switch 74. The opposite pole of the motor 15 is connected by a switch line 62 with the terminal 63 of the relay lighting switch.

The line 24 from the source of A. C. current, and say of 110 volts, runs to the opposite terminals of the auxiliary motor devices A28, B28, C28, D28, one pole of the master generator device 22, and relay motor and lighting switch terminals 64, 65. The opposite motor switch terminal 66 is connected by a switch line 67 with the lighting relay switch terminal 68.

Lines 71 and 72 run from a second convenient source of energy, not shown, preferably direct current of a less voltage. Line 71 runs to the motor starting relay coils 73, 74, connecting the latter with the brush 47, on the conductor arm 46, Figs. 7, 8, and connecting the coil 73 with the circuit closing devices A', B', C', D'. Line 72 connects the several devices A1, B1, C1, D1 to the source of energy. Lines A2, B2, C2, D2 respectively connect the several closing devices or contacts with corresponding terminals 40 on the disk 39. It is understood of course that there may be as many circuit closing devices on the control board as there are terminals on the disk 39. As stated, the switch line 69 connects the relay terminal 70 with the several annunciator lamps A, B, C and D. The master generator device 22 and the several motor auxiliary devices 28 are connected and operatively synchronized, as stated, by the energy control lines 25, 26, 27.

When A. C. current is supplied to the lines 23 and 24 and all contacts are open in the circuit closing devices, all annunciator motors will immediately synchronize with the master generator as to rotative angularity, since they are all free to move and the generator is not.

When at the control board or station by any suitable circuit closing device A1, B1, C1, D1, say A1, the three contacts 72, A′, A2 are closed, thus connecting through the lines 71, 72, the source of energy to the relay coil 73 which closes the contacts 64, 66, thus closing the circuit through line 24, switch line 67, switch 74, switch line 62 and line 23 starting the motor 15, also connecting the corresponding contact 40, on disk 39, through the line A2 to the line 72. Motor 15 (Fig. 4) operating through gears 16, 17, shaft 18, worm 19, and gear 20, moves the rotor of the master generator 22 and, through the control wires 25, 26, 27, rotates all the supplementary motors and indicators 28 in synchronism. It also moves, by means of the disk 45, the arm 46 and contact arm 48, the whole being rotated in a clockwise direction.

When the contact arm 48 has rotated to the point where it engages the contact 40 on disk 39 which is connected in the circuit closing device A1 to line 72, current from the source of energy will flow through lines 72, A2, contact 40, contact arm 48, disk 43, shaft 38, line 71, and relay coil 74 to line 71, thus energizing the coil of the relay 74, which opens the switch line 62 and stops the motor 15, closes the circuit through line 24, the line 23 to the magnet 57, operating the dog 56, which engages a tooth on the disk 51, stopping it at the precise point desired and preventing an over run, due to the momentum of the moving parts, also closing the circuit through the line 69 and lamp in each annunciator to line 23 which lamps remain lighted until the circuit closing device is released.

Let it be supposed that cards bearing the names of doctors are inserted in all the annunciator racks at the same angular rotative position, and that similar cards identifying the particular contacts in the control board which are connected to the generator in the same angular rotative position, then the closing of either circuit by means of a switch as described above will cause the annunciators to display the card of the party called, and each will flash a light which not only illuminates the name, but draws attention, which is desirable.

Inasmuch as the gear 20 is rotated through a friction lock with shaft 21, the latter may continue to rotate a little relative to the gear after the latter has stopped, to prevent any damage to the mechanism. When another party is wanted, the motor is again started, as before, by use of the plug in the same manner in the proper calling circuit, and it will stop its annunciator at the proper time displaying the name of the party called for by the particular calling circuit in use.

The foregoing described mechanism provides a novel and improved means for visibly calling without noise any desired party at any point in the institution.

Commonly this service is performed audibly by signaling, either calling the party's name over a loud speaker or by sounding a code signal on a bell.

Both of these systems have the obvious disadvantage that they are annoying to other people, especially in a hospital or like institution.

If silent signaling is done by a lamp annunciator, it has the drawback that it is not personal and requires the use of directories or code books.

Our invention overcomes all these disadvantages in addition to possessing the merits heretofore pointed out.

It is of course to be understood that the central or calling station may be at one point, the driving motor and main rotary motion transmitting device and associated parts at another point, and the several auxiliary motor devices and their annunciators each at still different points as far away as desired, so long as they are operatively connected by suitable operating lines.

Our invention is not limited to the particular embodiment thereof described and illustrated.

We claim:

1. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, circuit means having selective operator controlled switch means for energizing said motor which drives said generator and for energizing a selected contact of said selective switch device, said circuit means including an electro-magnetic switch for deenergizing the last mentioned motor, and circuit means controlled by said selective switch device for energizing both said switch and said stop device for deenergizing said last mentioned motor and stopping said generator when said relatively movable part of said selective switch device is moved into contact with the selected contact thereof.

2. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, circuit means including a selective operator controlled switch means for energizing both a selected contact of said selective switch device and said motor which drives said generator, and circuit means controlled by said selective switch device for deenergizing said motor which drives said generator and for energizing said electro-magnetically operated stop device whereby when said relatively movable part of said selective switch device is moved into contact with said selected contact said motor will be deenergized and said stop means will be operated to stop movement of said generator.

3. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, circuit means including a selective operator controlled switch means for energizing both a selected contact of said selective switch device and said motor which drives said generator, an electro-magnetically operated switch in said circuit means, and circuit means controlled by said selective switch device for operating said electro-magnetically operated switch into open position and for operating said electro-magnetically operated stop device whereby when said relatively movable part of said selective switch device is moved into contact with said selected contact thereof said electro-magnetically operated switch will open the first mentioned circuit means to deenergize said motor which drives said generator and said stop means will be operated to stop movement of said generator.

4. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, circuit means including a selective operator controlled switch means for energizing both a selected contact of said selective switch device and said motor which drives said generator, an electric lamp for said display member, and circuit means controlled by said selective switch device for energizing said lamp and said electro-magnetically operated stop device and for deenergizing said motor which drives said generator whereby when said relatively movable part of said selective switch device is moved into contact with said selected contact thereof said lamp will be energized while said motor will be deenergized and said stop means energized to stop movement of said generator.

5. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, circuit means for energizing said motor which drives said generator having a normally open and a normally closed electro-magnetically operated switch in series, circuit means including selective operator controlled switch means for energizing a selected contact of said selective switch device and for energizing said normally open switch to close it for energizing the last mentioned motor, and circuit means controlled by said selective switch device for energizing said normally closed switch for opening it when said relatively movable part of said selective switch device is moved into contact with the selected contact thereof and for simultaneously energizing said magnetic stop device for stopping movement of said generator.

6. A visible paging system having, in combination, an annunciator including a movable indicia bearing and display member, an electric generator, an electric motor electrically connected to said generator for energization thereby and adapted to operate synchronously therewith, said motor being operatively connected to said display member for moving it, an electric motor operatively connected to said generator for driving it, means for stopping said generator when rotated to a predetermined position comprising an electro-magnetically operated stop device, a selective switch device having a part carrying a plurality of contacts and a relatively movable switch part cooperating therewith, one of which parts is operatively connected to said generator for movement with the latter, an electric lamp for said display member, circuit means for energizing said motor which drives said generator having a normally open and a normally closed electro-magnetically operated switch in series, circuit means including selective operator controlled switch means for energizing a selected contact of said selective switch device and for energizing said normally open switch to close it for energizing the last mentioned motor, circuit means controlled by said selective switch device for energizing said normally closed switch for opening it when the relatively movable part of said selective switch device is moved into contact with the selected contact thereof and for simultaneously energizing said magnetic stop device for stopping movement of said generator, a circuit for said lamp having a normally open switch, and means operated when the movable part of said selective switch device is moved into contact with the selected contact thereof for closing said switch of said circuit for said lamp.

ALFRED J. HIXON.
WILLARD W. THOMPSON.